(12) United States Patent
Umika

(10) Patent No.: US 6,387,537 B1
(45) Date of Patent: May 14, 2002

(54) EPOXY RESIN COMPOSITION AND SEMICONDUCTOR DEVICE

(75) Inventor: Fumihiro Umika, Utsunomiya (JP)

(73) Assignee: Sumitomo Bakelite Co., Ltd., Tokyo (JP)

( * ) Notice: Subject to any disclaimer, the term of this patent is extended or adjusted under 35 U.S.C. 154(b) by 0 days.

(21) Appl. No.: 09/668,293

(22) Filed: Sep. 25, 2000

(51) Int. Cl.$^7$ .................................................. H01L 29/12
(52) U.S. Cl. ........................ 428/620; 523/200; 523/205; 523/451; 524/414
(58) Field of Search ................................. 523/200, 204, 523/205, 206, 208, 213, 451; 524/414; 428/620

(56) References Cited

U.S. PATENT DOCUMENTS

| | | |
|---|---|---|
| 5,041,490 A | 8/1991 | Sakon et al. |
| 5,869,553 A * | 2/1999 | Ueda .......................... 523/451 |

FOREIGN PATENT DOCUMENTS

| | | |
|---|---|---|
| EP | 0 195 131 A2 | 9/1986 |
| EP | 0 638 608 A1 | 2/1995 |
| EP | 0 763 566 A1 | 3/1997 |
| EP | 0 783 025 A2 | 7/1997 |
| EP | 0 978 540 A1 | 2/2000 |
| JP | 62021704 | 1/1987 |
| JP | 815427 A | 6/1996 |
| JP | 8-151505 | 6/1996 |
| JP | 9-165495 | 6/1997 |
| JP | 10152599 A | 6/1998 |
| JP | 11279379 | 10/1999 |
| JP | 2000248155 | 9/2000 |

OTHER PUBLICATIONS

Copy of Austrian Search Report in counterpart appln. No. 200005481–7, dated Apr. 17, 2001.
European Search Report for corresponding European Application No. EP 00 12 0923 dated Nov. 8, 2001.
Abstract for JP 08 100108 published Apr. 16, 1996, Chemical Abstracts Service, Columbus, Oh, Databse Accession No. 125:88772, XP002180090.

* cited by examiner

Primary Examiner—Robert Dawson
Assistant Examiner—D. Aylward
(74) Attorney, Agent, or Firm—Smith, Gambrell & Russell, LLP

(57) ABSTRACT

The object of the present invention is to provide an epoxy resin compositions for encapsulating of semiconductors containing no bromine compounds and no antimony oxide and excellent in flame retardancy, moisture resistance, moldability, curability and electric characteristics. This composition is an epoxy resin composition containing (A) an epoxy resin, (B) a phenolic resin, (C) a curing accelerator, (D) an inorganic filler and (E) a red phosphorus-based flame retardant, wherein the improvement comprises the red phosphorus-based flame retardant (E) having a total content of phosphate ion and phosphite ion extracted from the retardant when subjected to extraction with water at 80° C. for 20 hours is not more than 2000 ppm, the amount of the red phosphorus in the red phosphorus-based retardant being 20–40% by weight and the red phosphorus-based retardant being contained in an amount of 0.5–5% by weight in the whole resin composition.

3 Claims, No Drawings

EPOXY RESIN COMPOSITION AND SEMICONDUCTOR DEVICE

BACKGROUND OF THE INVENTION

The present invention relates to an epoxy resin composition for encapsulating semiconductors which is excellent in flame retardancy, and to a semiconductor device.

Conventionally, electronic parts such as diodes, transistors and integrated circuits are mainly encapsulated in an epoxy resin composition. This epoxy resin composition contains a bromine compound or a combination of a bromine compound and antimony oxide as a flame retardant, and fused silica or crystalline silica as an inorganic filler. However, from the point of environmental hygiene, flame-retardant resin compositions are demanded which contain neither bromine compounds nor antimony oxide.

For meeting this demand, there has been proposed a red phosphorus-based flame retardant obtained by covering the surface of red phosphorus with a metal hydroxide such as aluminum hydroxide or magnesium hydroxide and further covering the surface of the metal hydroxide with a phenolic resin. However, phosphate ion and phosphite ion eluting from this flame retardant adversely affect moldability and curability of the resin composition and moisture resistance and electric characteristics of the resulting semiconductors, and, thus, none of the resin compositions containing red phosphorus-based flame retardants have satisfied the moldability, the curability, the moisture resistance and the electric characteristics.

SUMMARY OF THE INVENTION

For solving the above problems, the present invention provides an epoxy resin composition for encapsulating of semiconductors which is excellent in flame retardancy without containing bromine compounds and antimony oxide by using a red phosphorus-based flame retardant in which total amount of phosphate ion and phosphite ion extracted from the red phosphorus-based retardant is adjusted to less than a certain amount, and provides a semiconductor device made using the resin composition.

The present invention relates to an epoxy resin composition for encapsulating of semiconductors which contains (A) an epoxy resin, (B) a phenolic resin, (C) a curing accelerator, (D) an inorganic filler and (E) a red phosphorus-based flame retardant, wherein the improvement comprises the red phosphorus-based flame retardant (E) having a total content of phosphate ion and phosphite ion eluted from the retardant when subjected to extraction with water at 80° C. for 20 hours is not more than 2000 ppm, the amount of the red phosphorus in the red phosphorus-based retardant being 20–40% by weight and the red phosphorus-based retardant being contained in an amount of 0.5–5% by weight in the whole resin composition, and to a semiconductor device manufactured by encapsulating semiconductor elements with said epoxy resin composition.

DETAILED DESCRIPTION OF THE INVENTION

The epoxy resins used in the present invention include all monomers, oligomers and polymers having two or more epoxy groups in one molecule, and molecular weight and molecular structure thereof are not limited. Examples of the epoxy resins are biphenyl type epoxy resins, bisphenol type epoxy resins, phenolic novolak type epoxy resins, cresol novolak type epoxy resins, triphenolmethane type epoxy resins, alkyl-modified triphenolmethane type epoxy resins and triazine ring-containing epoxy resins. These may be used each alone or in admixture.

The phenolic resins used in the present invention include all monomers, oligomers and polymers having two or more phenolic hydroxyl groups in one molecule, and molecular weight and molecular structure thereof are not limited. Examples of the phenolic resins are phenolic novolak resins, cresol novolak resins, dicyclopentadiene-modified phenolic resins, phenolic aralkyl resins, terpene-modified phenolic resins and triphenolmethane type resins. These may be used each alone or in admixture. As the amount of the phenolic resins, it is preferred that the equivalent ratio of the number of epoxy groups in the epoxy resin and the number of phenolic hydroxyl groups in the phenolic resin is in the range of 0.8–1.2.

The curing accelerators used in the present invention can be those which accelerate the curing reaction of the epoxy group and the phenolic hydroxyl group, and those which are generally used for encapsulating materials can be widely used. Examples thereof are 1,8-diazabicyclo(5,4,0)undecene-7 and 2-methylimidazole. These may be used each alone or in admixture.

The inorganic fillers used in the present invention include, for example, fused silica powder, crystalline silica powder, alumina and silicon nitride, and fused silica powder and crystalline silica powder are preferred. Amount of the inorganic fillers is preferably 70–95% by weight in the whole resin composition from the point of balancing between moldability and reliability. Furthermore, in order to obtain good fluidity and filling properties, the inorganic fillers preferably have an average particle size of 11–20 $\mu$m, and such a particle size distribution that those of not more than 10 $\mu$m in particle size are present in an amount of 20–45% by weight and those of not less than 70 $\mu$m are present in an amount of not more than 10% by weight in the whole resin composition. In a resin composition containing the inorganic filler in a large amount, it is especially preferred to use spherical fused silica powder.

The red phosphorus-based flame retardants used in the present invention are those which have a total content of phosphate ion and phosphite ion eluted from the retardants when subjected to extraction at 80° C. for 20 hours is not more than 2000 ppm. In general, red phosphorus alone brings about an oxidation-reduction disproportionation reaction in the presence of moisture when it is left to stand in the air, thereby forming an oxide of phosphorus or an acid on the surface of the red phosphorus particles and simultaneously generating harmful hydrogen phosphide. Since this reaction involves generation of heat, there is the possibility of spontaneous ignition.

Furthermore, in water, red phosphorus causes decrease of pH of water with increase of immersion time to produce an oxide of phosphorus, namely, phosphate ion and phosphite ion, thereby not only causing contamination of the surrounding air with hydrogen phosphide, but also inviting danger of explosion. Moreover, since red phosphorus is highly sensitive to heat or friction and readily ignites and burns at relatively low temperatures or by a slight shock, it always involves dangerousness.

Therefore, red phosphorus is usually covered with a metal hydroxide such as aluminum hydroxide or magnesium hydroxide, and the surface is further covered with a phenolic resin to inhibit contact of red phosphorus with water, whereby oxidation stability of phosphorus is enhanced and, besides, heat resistance and shock resistance are increased.

In this case, content of red phosphorus is 80–95% and the metal hydroxide is thinly covered on the outside of red phosphorus. In some cases, only one of the two coverings is made. However, the merely covered red phosphorus is too high in its content and sometimes a part of red phosphorus is exposed due to insufficient covering, and, thus, there is the possibility of ignition owing to a shock. Therefore, in the present invention, a metal hydroxide and a phenolic resin are further added so that the covered red phosphorus has finally a red phosphorus content of 20–40% by weight, namely, there is used a red phosphorus-based flame retardant which is safe against heat and shock.

The contents of phosphate ion and phosphite ion in the red phosphorus-based flame retardant are measured in the following manner. 5 Grams of a sample of the red phosphorus-based flame retardant and 50 grams of pure water are charged in a vessel and treated at 80° C. for 20 hours, followed by measuring the amounts of phosphate ion and phosphite ion in the extraction water by ion chromatography.

There are no limitations in the red phosphorus-based retardants as far as the total content of phosphate ion and phosphite ion eluted by the extraction at 80° C. for 20 hours is not more than 2000 ppm, but preferred are those in which the red phosphorus content is adjusted to 20–40% by weight by further adding aluminum hydroxide and a phenolic resin to the red phosphorus covered with aluminum hydroxide and phenolic resin.

If the amount of the red phosphorus-based flame retardant in which the total content of phosphate ion and phosphite ion eluted when subjected to the extraction at 80° C. for 20 hours is not more than 2000 ppm and the red phosphorus content is 20–40% by weight is less than 0.5% by weight in the whole resin composition, the amount of red phosphorus is insufficient and flame retardancy is insufficient, and if the amount of the red phosphorus-based flame retardant is more than 5.0% by weight, moisture resistance, moldability, curability and electric characteristics of the resin composition are deteriorated. Moreover, when the total content of phosphate ion and phosphite ion eluted when subjected to the extraction at 80° C. for 20 hours exceeds 2000 ppm in the red phosphorus-based flame retardant, even if amount of the red phosphorus-based flame retardant is in the range of 0.5–5.0% by weight in the whole resin composition, moisture resistance, moldability, curability and electric characteristics are further deteriorated.

The epoxy resin composition of the present invention preferably comprises (A) 2–20% by weight of the epoxy resin, (B) 2–20% by weight of the phenolic resin, (C) 0.01–1% by weight of the curing accelerator, (D) 70–95% by weight of the inorganic filler and (E) 0.5–5% by weight of the red phosphorus-based flame retardant, with the total amount of these components being 100% by weight, in view of fluidity, curability, and balance between moldability and reliability.

If necessary, the resin composition of the present invention may optionally contain, in addition to the components (A)–(E), a silane coupling agent, a coloring agent such as carbon black or red iron oxide, a releasing agent such as natural wax or synthetic wax, and a low stress additive such as silicone oil or rubber.

The resin composition of the present invention can be made into a molding material by sufficiently uniformly mixing the components (A)–(E) and other additives by a mixer or the like, thereafter melt kneading the mixture by a hot roll, a kneader or the like, cooling the kneaded product and then grinding it. The resulting molding material can be applied to coating, insulation and encapsulating of transistors, integrated circuits and the like which are electrical parts or electronic parts.

For making semiconductor devices by encapsulating electronic parts such as semiconductor elements using the resin composition of the present invention, the composition can be molded and cured by molding methods such as transfer molding, compression molding and injection molding.

By using the epoxy resin compositions for encapsulating of semiconductors of the present invention, there are obtained semiconductor devices containing no bromine compounds and no antimony oxide and excellent in flame retardancy, moisture resistance, moldability, curability and electric characteristics.

DESCRIPTION OF PREFERRED EMBODIMENTS

The present invention will be explained specifically in the following examples.

EXAMPLES 1–4 and

Comparative Examples 1–5

The components shown in Tables 1 and 2 were mixed at room temperature by a mixer, the resulting mixture was kneaded using a roll at 70–100° C., and the kneaded product was cooled and then ground to obtain a molding material. The resulting molding material was tabletted and the tablets were molded using a low-pressure transfer molding machine under the conditions of 175° C., 70 kg/cm$^2$ and 120 seconds to prepare a flame resistant specimen. Furthermore, a semiconductor element of 3 mm×3.5 mm was encapsulated in a 16pDIP for moisture resistant test. The encapsulated element for testing was subjected to the following moisture resistant test. Moreover, a high-temperature leakage test was conducted using the above 16pDIP. Curing characteristic was measured with a curability testing machine (manufactured by NICHIGO SHOJI CO., LTD.; trade name "CURELASTOMETER V").

Materials used as the components are as follows:

Biphenyl type epoxy resin (melting point: 110° C. and epoxy equivalent: 195 g/eq.).

Phenolic aralkyl resin (softening point: 80° C. and hydroxyl equivalent: 174 g/eq.).

1,8-Diazabicyclo(5,4,0)undecene-7 (hereinafter referred to as "DBU").

Red phosphorus-based flame retardant 1 (content of red phosphorus: 30%, and extracted phosphate ion+extracted phosphite ion=1600 ppm).

Red phosphorus-based flame retardant 2 (content of red phosphorus: 30%, and extracted phosphate ion+extracted phosphite ion=1900 ppm).

Red phosphorus-based flame retardant 3 (content of red phosphorus: 30%, and extracted phosphate ion+extracted phosphite ion=2200 ppm).

Spherical fused silica powder (average particle size: 22 μm, and specific surface area: 2.2 m$^2$/g).

Carbon black.

Carnauba wax.

Method for measurement of phosphate ion content in the red phosphorus-based flame retardant: 5 Grams of a sample of the red phosphorus-based flame retardant and 50 grams of pure water were charged in a vessel and treated at 80° C. for 20 hours, followed by measuring the amounts of phosphate ion and phosphite ion in the extraction water by ion chromatography.

Evaluation methods:

Spiral flow: This was measured at a mold temperature of 175° C. and under a pressure of 70 kg/cm² using a mold in accordance with EMMI-I-66.

Moldability: A curing time for which 16pDIP can be molded under the conditions of a mold temperature of 175° C. and a pressure of 70 kg/cm² by a low-pressure transfer molding machine was taken as a criterion for moldability.

Flame resistant test: UL-94 vertical test (thickness of sample: 3.2 mm) was conducted and the result was expressed as flame retardancy.

Moisture resistant test: An encapsulated element for testing was subjected to pressure cooker test (125° C., pressure: 2.2 kg/cm²), and failure in opening of circuit was examined. The moisture resistance was expressed by the time in which the failure occurred.

High-temperature leakage current test: The high-temperature leakage current of 16pDIP (150° C.) was measured.

Curability test: Using a mold for curability test and under the condition of a mold temperature of 175° C., torque after 60 seconds and 90 seconds from beginning of the measurement was measured.

The results of evaluation are shown in Tables 1 and 2.

TABLE 1

| | Example | | | |
|---|---|---|---|---|
| | 1 | 2 | 3 | 4 |
| Biphenyl type epoxy resin | 6.8 | 6.8 | 6.8 | 6.8 |
| Phenolic aralkyl resin | 5.4 | 5.4 | 5.4 | 5.4 |
| DBU | 0.2 | 0.2 | 0.2 | 0.2 |
| Red phosphorus-based flame retardant 1 | 1.0 | 4.5 | | |
| Red phosphorus-based flame retardant 2 | | | 1.0 | 4.5 |
| Spherical fused silica powder | 86.0 | 82.5 | 86.0 | 82.5 |
| Carbon black | 0.3 | 0.3 | 0.3 | 0.3 |
| Carnauba wax | 0.3 | 0.3 | 0.3 | 0.3 |
| Spiral flow (cm) | 120 | 100 | 120 | 100 |
| Moldability (sec) | 70 | 90 | 70 | 90 |
| Flame retardancy (UL-94) | V-0 | V-0 | V-0 | V-0 |
| Moisture resistance (hr) | 450 | 400 | 450 | 400 |
| High-temperature leakage current (nA) | 0.5 | 1.5 | 0.5 | 1.5 |
| Curability 60 sec (kgf·cm) | 40 | 35 | 40 | 35 |
| 90 sec (kgf·cm) | 60 | 55 | 60 | 55 |

TABLE 2

| | Comparative Example | | | | |
|---|---|---|---|---|---|
| | 1 | 2 | 3 | 4 | 5 |
| Biphenyl type epoxy resin | 6.8 | 6.8 | 6.8 | 6.8 | 6.8 |
| Phenolic aralkyl resin | 5.4 | 5.4 | 5.4 | 5.4 | 5.4 |
| DBU | 0.2 | 0.2 | 0.2 | 0.2 | 0.2 |
| Red phosphorus-based flame retardant 1 | | 0.4 | 5.5 | | |
| Red phosphorus-based flame retardant 3 | | | | 3.0 | 5.5 |
| Spherical fused silica powder | 87.0 | 86.6 | 81.5 | 84.0 | 81.5 |
| Carbon black | 0.3 | 0.3 | 0.3 | 0.3 | 0.3 |
| Carnauba wax | 0.3 | 0.3 | 0.3 | 0.3 | 0.3 |
| Spiral flow (cm) | 120 | 120 | 80 | 90 | 70 |
| Moldability (sec) | 70 | 70 | 180 | 120 | 200 |
| Flame retardancy (UL-94) | Totally burnt | V-1 | V-0 | V-0 | V-0 |
| Moisture resistance (hr) | 450 | 450 | 300 | 300 | 250 |
| High-temperature leakage current (nA) | 0.5 | 0.5 | 2.5 | 2.5 | 3.5 |
| Curability 60 sec (kgf · cm) | 40 | 40 | 25 | 25 | 20 |
| 90 sec (kgf · cm) | 60 | 60 | 45 | 45 | 30 |

What is claimed is:

1. An epoxy resin composition for encapsulating of semiconductors which contains (A) an epoxy resin, (B) a phenolic resin, (C) a curing accelerator, (D) an inorganic filler and (E) a red phosphorus-based flame retardant, wherein the improvement comprises the red phosphorus-based flame retardant (E) having a total content of phosphate ion and phosphite ion eluted from the retardant when subjected to an extraction with water at 80° C. for 20 hours is not more than 2000 ppm, the amount of the red phosphorus in the red phosphorus-based retardant being 20–40% by weight and the red phosphorus-based retardant being contained in an amount of 0.5–5% by weight in the whole resin composition.

2. A composition according to claim 1, which comprises (A) 2–20% by weight of an epoxy resin, (B) 2–20% by weight of a phenolic resin, (C) 0.01–1% by weight of a curing accelerator, (D) 70–95% by weight of an inorganic filler and (E) 0.5–5% by weight of a red phosphorus-based flame retardant, the total amount of the components being 100% by weight.

3. A semiconductor device which is obtained by encapsulating a semiconductor element using the epoxy resin composition of claim 1.

* * * * *